June 1, 1965 TAKAO MATSUSHIMA 3,187,261

PULSE SELECTING CIRCUIT

Filed Sept. 27, 1960

Inventor
T. MATSUSHIMA
By C. H. Suydam
AGENT

United States Patent Office 3,187,261

Patented June 1, 1965

3,187,261

PULSE SELECTING CIRCUIT

Takao Matsushima, Tokyo, Japan, assignor to Nippon Electric Company, Limited, Tokyo, Japan, a corporation of Japan Filed Sept. 27, 1960, Ser. No. 58,827

Claims priority, application Japan, Oct. 20, 1959, 34/33,232

6 Claims. (Cl. 328—110)

The present invention relates to circuits for selecting a pulse group having a given periodic repetition rate from a pulse-train of random pulses. Specifically, said pulse group may be a group of synchronizing pulses within a random pulse-train series. It will be understood that the random pulse-train series has repetition frequencies equal to, or an integral multiple of, the repetition rate of the group of synchronizing pulses except that the random pulse train series is lacking pulses at predetermined time intervals. Otherwise these pulse trains differ only in their relative phase.

These pulse trains are generally found in pulse code modulation systems, data transmission systems, etc. Furthermore, the relation of picture signals to horizontal and vertical synchronizing signals in television transmission systems may be dealt with as similar pulse-train series.

In these systems, pulse trains consist of two parts; one pulse groups, which are distributed in time, corresponding to time variation of siganls, and the other, the so-called synchronizing pulse trains inserted at a prescribed repetition period for the purpose of determining the starting and ending times of signals or for separating multiplex channels. In these systems, therefore, it becomes an indispensable condition that a synchronizing pulse-train be selected at the receiver from the pulse-time trains which are transmitted from the transmitter.

Regarding this point, several known methods have been proposed. The essential features in the operation of all methods are the discrimination of the synchronizing pulses and the recovery time for synchronization.

The prime object of the present invention resides in the improvement of these features. According to the present invention, the recovery time for synchronization is shortened and the section of synchronizing pulse trains made reliable, even in the presence of pulse trains exactly similar to a synchronizing pulse train, by utilizing a pulse pattern in which certain pulses of the pulse trains are lacking at certain time intervals or certain pulses are intentionally omitted. The principle of the present invention will be further clarified by the following description in conjunction with the accompanying drawings:

Figure 1:
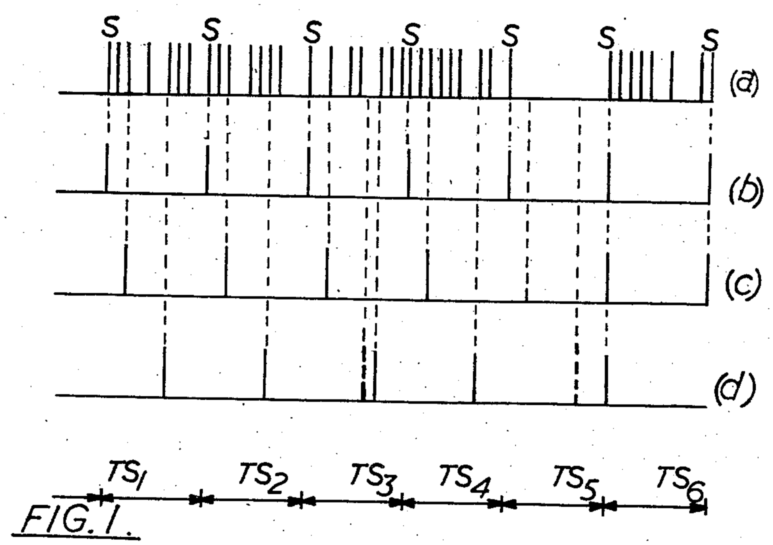
FIG. 1 illustrates pulse patterns for indicating the manner of operation of the pulse selection circuit according to the present invention.

Referring to FIG. 1, even though the pulses as shown in the figure are of constant amplitude and the pulse intervals are $1/n$ or an integral multiple of that of a periodic repetition pulse (hereinafter referred to as "synchronizing" pulse), the pulse selection circuit according to the present invention is by no means subject to such limitations. The complete input pulse train consists, as indicated in FIG. 1(*a*), of (1) a synchronizing pulse group S having a repetition period T*s* and (2) a signal pulse train in which the pulses exist at random.

Figure 2:
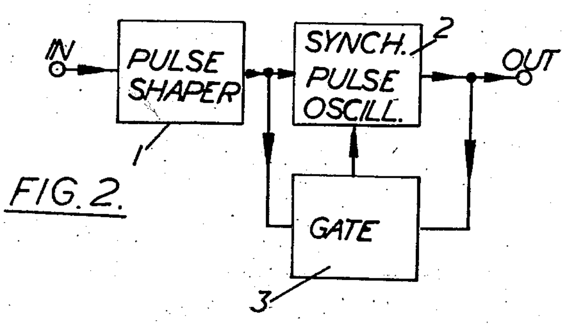
FIG. 2 illustrates a schematic block diagram illustrating the principle of operation of the circuit according to the present invention.

Referring to FIG. 2, the input pulse train is suitably shaped by the pulse shaping circuit 1, e.g. a monostable multivibrator, without its pulse pattern being changed and is then applied to the externally synchronized pulse oscillator 2 having a natural repetition period equal to the synchronizing repetition period T*s*. Such a synchronized pulse oscillator circuit may be considered to have a time constant equal to T*s* and, as described below, is instrumental in removing pulses existing in the intervals T*s*. Synchronized oscillators which are suitable for carrying out my invention are, for example, the externally synchronized type of multivibrator or the externally synchronized type of blocking oscillator. With such an oscillator, however, there is no way of determining its starting time with respect to the starting time of the input pulse train, an oscillation being initiated by a random pulse at an arbitrary position in the input pulse train.

FIG. 1(*b*) shows a case in which the externally synchronized pulse oscillator is synchronized with the synchronizing pulse group S.

FIG. 1(*c*) shows a case in which the externally synchronized pulse oscillator is initially caused to be synchronized with a pulse (in the second position of nine within the synchronizing interval T*s*–1) of the random signal pulse train and is synchronized with the synchronizing pulse group S in the synchronizing interval T*s*–5.

FIG. 1(*d*) is similar to FIG. 1(*c*) except that the externally synchronized oscillator is first caused to be synchronized with a pulse appearing in the sixth pulse position within the synchronizing interval T*s*–1, is delayed to the seventh pulse position in interval T*s*–3, and finally synchronized with the synchronizing pulse group S in interval T*s*–5. Both the pulse oscillator output and the pulse train output from the wave-shaping circuit are applied to the gating circuit 3 in FIG. 2, wherein the pulses in the pulse-train output serve as control or inhibiting pulses for gating action. This gating circuit which may be linked to an inhibitor circuit has the function of producing controlling output gating pulses for inhibiting an oscillation of the synchronized pulse oscillator in the absence of said control pulses and maintaining oscillations under certain conditions which will now be described. If an output pulse train from the synchronized pulse oscillator coincides with the synchronizing pulse train in the input pulse group, the gating circuit produces no output and synchronous oscillation is sustained under these conditions. But, if a pulse in the oscillator output pulse train appears at a time when there is no corresponding pulse in the synchronizing pulse train as shown at (*c*) or (*d*) in FIG. 1, the pulse oscillator is caused to stop until a succeeding input pulse arrives in the pulse train, for example, in the interval T*s*–5 in case of (*c*), and in the intervals T*s*–3 and T*s*–5 in case of (*d*), since there are no control pulses to the gating circuit in these instances. In other words, the only ultimately attainable and stable state of this pulse selection circuit is one in which it is synchronized by the synchronizing pulse group S. Although a detailed description of the pulse selection circuit has been made above referring to FIG. 1, the input of the present circuit is by no means restricted to the pulse train as illustrated in FIG. 1, but it may be, for example, a randomly time-distributed pulse group comprising a pulse train other than a synchronizing pulse train.

Figure 3:
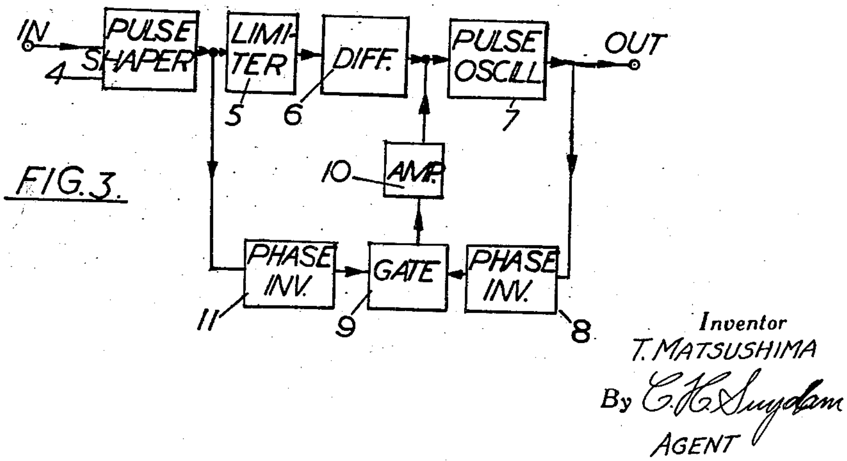
FIG. 3 shows a schematic block diagram for an embodiment of the pulse selection circuit according to the present invention.

FIG. 3 shows an embodiment of the pulse selection circuit according to the present invention. In the figure, the waveform shaping circuit consists of a mono-stable multivibrator 4, a limiter 5, and a differentiating circuit 6 for producing trigger pulses. The input pulse group furnishes trigger pulses for driving the pulse oscillator 7 on one hand, and produces pulses for controlling the gating circuit 9 on the other. The pulse oscillator 7 is an externally synchronized multivibrator and the oscillation suspension mechanism due to the gating action in this case is as follows:

A negative feedback loop containing circuits 8, 9 and 10 via the gating circuit with respect to the multivibrator is completed when there are no gating control pulses, whereby the oscillation of the multivibrator is caused to stop. In the presence of a gate control input, this gating circuit produces no output with the result that normal oscillation takes place, there being no negative feedback due to the loop. In FIG. 3, block 10 is an amplifier for obtaining a necessary negative feedback gain. Blocks 8 and 11 are phase inverters as may be required or not depending, for example, on the polarity of the control pulses and the polarity of the pulses for operating the gate circuits.

As has been described above, the pulse selection circuit according to the present invention selects a pulse train having a prescribed repetition period from a pulse train comprising a series of random pulse trains. Features of the circuit construction lie in the pulse selective ability due to the externally synchronized type pulse oscillator and the gating action for controlling the pulses developed by the pulse oscillator depending on whether or not the output pulse train from said oscillator coincides with a periodic repetition pulse train in the input pulse train. By use of such a pulse selection circuit, reliable pulse selection can be performed and the recovery time can be reduced to a minimum in the event that synchronism is lost.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A pulse selection circuit for selecting a periodic pulse group having a predetermined pulse repetition rate from the pulses of a series of random pulse trains containing said periodic pulse group comprising: an externally synchronized free running oscillator having a pulse repetition rate equal to that of said periodic pulse group means for triggering said oscillator with the pulses of said random pulse trains to produce output pulses, said oscillator, once triggered, being insensitive to subsequent random pulses during the period determined by said predetermined repetition rate; a gating circuit having an inhibiting input and a normally-through input; a negative feedback path from the output of said oscillator through said normally-through input of said gating circuit to the input of said oscillator for inhibiting the triggering of said oscillator in the absence of a signal on said inhibiting input of said gating circuit; and means for applying the pulses of said random pulse trains to said inhibiting input of said gating circuit; whereby when the pulses of said pulse trains are coincident with said oscillator output pulses said negative feedback circuit is without affect.

2. A pulse selection circuit according to claim 1, wherein the pulses of said series of random pulse trains are characterized in that they occupy substantially equally spaced time positions, those pulses of the trains which are not components of the group of periodic pulses being further characterized in that they may or may not appear in any time position.

3. A pulse selection circuit according to claim 1 wherein the means for triggering said oscillator comprises a limiter and a differentiating circuit.

4. A pulse selection circuit according to claim 3 further comprising a wave form shaping circuit connected to said limiter.

5. A pulse selection circuit according to claim 1 further comprising a phase inverter connected in said feedback path to provide the proper polarity relation inhibiting the triggering of said oscillator.

6. A pulse selection circuit according to claim 1 wherein said externally synchronized oscillator comprises a multivibrator.

References Cited by the Examiner

UNITED STATES PATENTS

| | | | |
|---|---|---|---|
| 2,903,677 | 9/59 | Curtis | 328—63 X |
| 3,040,260 | 6/62 | Nichols | 328—110 |

OTHER REFERENCES

Millman and Taub, Pulse and Digital Circuits, McGraw-Hill, 1956, N.Y. (pages 18, 39 to 40, 111 to 119 relied on).

Washburn: "Application of Boolean Algebra to the Design of Electronic Switching Circuits," A.I.E.E. Transactions on Communications and Electronics, vol. 72, No. 1, 1953 (pages 380 to 388, page 384 relied on).

Millman et al.: Pulse and Digital Circuits, 1956 (pages 116, 174 to 179, 283 to 284 relied on).

ARTHUR GAUSS, *Primary Examiner.*

GEORGE N. WESTBY, *Examiner.*